(12) United States Patent
Ha et al.

(10) Patent No.: US 9,890,924 B2
(45) Date of Patent: Feb. 13, 2018

(54) OPTICAL DEVICE AND LIGHT SOURCE MODULE INCLUDING THE SAME

(71) Applicant: SAMSUNG ELECTRONICS CO., LTD., Suwon-si (KR)

(72) Inventors: Sang Woo Ha, Seongnam-si (KR); Jong Pil Won, Hwaseong-si (KR); Won Soo Ji, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 60 days.

(21) Appl. No.: 15/147,307

(22) Filed: May 5, 2016

(65) Prior Publication Data
US 2017/0074484 A1 Mar. 16, 2017

(30) Foreign Application Priority Data
Sep. 10, 2015 (KR) .......................... 10-2015-0128116

(51) Int. Cl.
| | | |
|---|---|---|
| *F21V 9/16* | (2006.01) | |
| *F21V 5/04* | (2006.01) | |
| *G02B 17/00* | (2006.01) | |
| *F21V 17/00* | (2006.01) | |
| *F21Y 103/10* | (2016.01) | |
| *F21Y 115/10* | (2016.01) | |

(52) U.S. Cl.
CPC .............. *F21V 5/048* (2013.01); *G02B 17/00* (2013.01); *F21V 17/005* (2013.01); *F21Y 2103/10* (2016.08); *F21Y 2115/10* (2016.08)

(58) Field of Classification Search
CPC .............................. F21V 5/048; F21Y 2115/10

USPC ............. 362/84, 249.02, 257, 317, 319, 361
See application file for complete search history.

(56) References Cited

U.S. PATENT DOCUMENTS

| | | |
|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |

(Continued)

FOREIGN PATENT DOCUMENTS

KR 1020130097951 A 9/2013

*Primary Examiner* — Vip Patel
(74) *Attorney, Agent, or Firm* — Sughrue Mion, PLLC

(57) ABSTRACT

An optical device and a light source module including the same are provided. The optical device includes a first surface including an incident portion through which light that is emitted from a light source is incident, and a second surface through which the light incident through the incident portion is emitted. The incident portion may include a curved surface that is recessed toward the second surface, and a pointed vertex to which the curved surface is recessed, the pointed vertex being in a central portion of the optical device, and the central portion being through which an optical axis of the optical device passes.

20 Claims, 11 Drawing Sheets

(56) References Cited

U.S. PATENT DOCUMENTS

| | | |
|---|---|---|
| 7,501,656 B2 | 3/2009 | Han et al. |
| 7,602,559 B2 | 10/2009 | Jang et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,602,605 B2 * | 12/2013 | Park, II ............... G02B 27/0955 362/311.02 |
| 8,735,931 B2 | 5/2014 | Han et al. |
| 8,766,295 B2 | 7/2014 | Kim |
| 2002/0080615 A1 * | 6/2002 | Marshall ................... F21V 5/04 362/333 |
| 2006/0066218 A1 | 3/2006 | Yamaguchi et al. |
| 2009/0052192 A1 | 2/2009 | Kokubo et al. |
| 2011/0164426 A1 | 7/2011 | Lee |
| 2012/0268950 A1 * | 10/2012 | Parkyn ..................... F21V 5/04 362/335 |
| 2013/0063952 A1 | 3/2013 | Ikeda et al. |
| 2013/0114022 A1 * | 5/2013 | Iiyama ............... G02B 19/0014 349/64 |
| 2013/0155690 A1 * | 6/2013 | Chen ........................ F21V 5/04 362/311.02 |
| 2014/0126222 A1 | 5/2014 | Wang et al. |
| 2014/0177235 A1 | 6/2014 | Lin |
| 2015/0029727 A1 | 1/2015 | Ikeda et al. |

\* cited by examiner

OPTICAL DEVICE AND LIGHT SOURCE MODULE INCLUDING THE SAME

CROSS-REFERENCE TO RELATED APPLICATION

This application claims priority from Korean Patent Application No. 10-2015-0128116 filed on Sep. 10, 2015, in the Korean Intellectual Property Office, the disclosure of which is incorporated herein by reference in its entirety.

BACKGROUND

1. Field

Apparatuses consistent with example embodiments relate to an optical device and a light source module including the same.

2. Description of the Related Art

Among lenses used in light emitting device packages, wide beam angle lenses are used to spread light laterally over a wide region from a central portion thereof, using the principle of refraction. However, light incident on a lens may not be uniformly diffused, in accordance with various types of package light sources, and a luminance distribution in a central region may be increased. In this manner, soft, diffused light may not be able to be realized due to non-uniformity in the distribution of the diffused light. Therefore, defects in optical uniformity such as Mura may occur in lighting devices or display devices.

SUMMARY

Example embodiments provide a solution capable of increasing uniformity in luminance distribution to emit soft, diffused light.

According to example embodiments, an optical device includes a first surface including an incident portion through which light that is emitted from a light source is incident, and a second surface through which the light incident through the incident portion is emitted. The incident portion may include a curved surface that is recessed toward the second surface, and a pointed vertex to which the curved surface is recessed, the pointed vertex being in a central portion of the optical device, and the central portion being through which an optical axis of the optical device passes.

The curved surface may include portions symmetrical based on the optical axis, the portions having variations in slopes that are discontinuous in the vertex.

A shape of the incident portion may satisfy a condition, $t=H \times \tan(2°)$, where $θ>10°$, an intersection point of the light source and the optical axis may be a reference point 'O,' a straight line perpendicular to the optical axis from the vertex may be a reference line 'R,' a straight line connecting a point of the incident portion and a point of the reference line 'R' from the reference point 'O' may be a straight line 'r1,' 'H' may be a height from the reference point 'O' to the vertex, '2°' may be an angle between the straight line 'r1' and the optical axis, 't' may be a distance from the vertex to the point of the reference line 'R,' and 'θ' may be an angle between a straight line 'r2' connecting the vertex and the point of the incident portion, and the reference line 'R.'

The incident portion may further include a free-form surface and may be rotationally symmetric with respect to the optical axis.

The second surface may be convex in a direction in which the light proceeds through the second surface, and a central portion of the second surface may have a maximum height, the central portion of the second surface being through which the optical axis passes.

The second surface may include a planar portion including a substantially flat surface in a central portion of the second surface, the central portion of the second surface being through which the optical axis passes, and a convex portion including a convex curve surface extending from an edge of the planar portion to an edge of the first surface.

The first surface may further include a recess toward the second surface, in a central portion of the second surface, the central portion of the second surface being through which the optical axis passes.

The incident portion may be a surface of the recess.

The first surface may include a support portion protruding from the first surface.

The support portion may include support portions disposed along a circumferential portion of the optical axis.

The optical device may include glass or a resin that is light-transmissive.

According to example embodiments, an optical device includes a first surface including a recess in a central portion of the optical device, the central portion being through which an optical axis of the optical device passes, and a second surface disposed opposite the first surface. The recess includes a curved surface through which light that is emitted from a light source is incident, the curved surface being recessed toward the second surface, and a pointed vertex to which the curved surface is recessed, the pointed vertex being in the central portion.

The curved surface may include portions symmetrical based on the optical axis, the portions having variations in slopes that are discontinuous in the vertex.

According to example embodiments, a light source module includes a light source emitting light, and an optical device disposed on the light source. The optical device includes a first surface including an incident portion through which the light is incident, and a second surface disposed opposite to the first surface, the second surface being through which the light incident through the incident portion is emitted. The incident portion may include a curved surface that is recessed toward the second surface, and a pointed vertex to which the curved surface is recessed, the pointed vertex being in a central portion of the optical device, and the central portion being through which an optical axis of the optical device passes.

The light source may include a light emitting diode (LED) chip or an LED package on which the LED chip is disposed.

The light source may further include an encapsulating part covering the LED chip.

The encapsulating part may include one or more phosphors.

The light source module may further include a substrate, the light source may include light sources disposed on the substrate, and the optical device may include optical devices disposed on the substrate.

The substrate may include a mark for guiding the optical device and the light source to a position on the substrate, the position being on which the optical device and the light source are disposed.

The light source module may further include a connector disposed on the substrate, the connector being connectable to an external power source.

According to example embodiments, an optical device includes a first surface through which light that is emitted from a light source passes, and a second surface through which the passed light is emitted. The first surface includes a recess toward the second surface to a vertex, the recess including a curved surface, and the recess being through which an optical axis of the optical device passes.

The first surface may further include a support protruding from the first surface.

The curved surface may include portions symmetrical about the optical axis, the portions may be recessed to the vertex, and the optical axis may pass through the vertex.

The second surface may be substantially flat in the central portion.

The second surface may be convex.

BRIEF DESCRIPTION OF DRAWINGS

The above and/or other aspects will be more apparent by describing example embodiments with reference to the accompanying drawings, in which.

DETAILED DESCRIPTION

Figure 1:
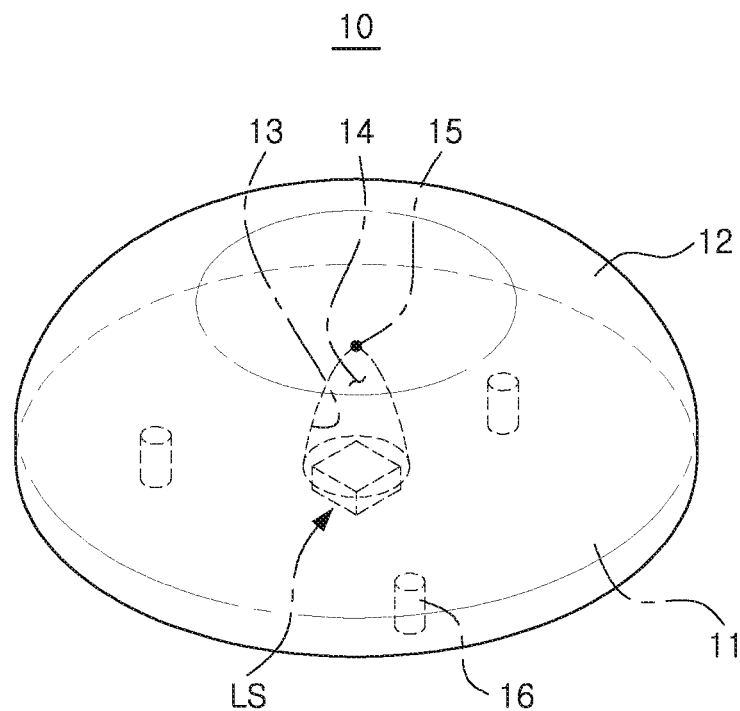
FIG. 1 is a schematic perspective view of an optical device according to an example embodiment.

Hereinafter, example embodiments will be described as follows with reference to the attached drawings.

The example embodiments may, however, be implemented in many different forms and may not be construed as being limited to the example embodiments set forth herein. Rather, these example embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more among the associated listed items.

It will be apparent that though the terms first, second, third, etc. may be used herein to describe various members, components, regions, layers and/or sections, these members, components, regions, layers and/or sections may not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a direction of the figures. The device may be otherwise oriented (rotated 90 degrees or at other orientations), and the spatially relative descriptors used herein may be interpreted accordingly.

The terminology used herein is for describing the example embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, the example embodiments will be described with reference to schematic views illustrating the example embodiments. In the drawings, for example, due to manufacturing techniques and/or tolerances, modifications of the shape shown may be estimated. Thus, the example embodiments may not be construed as being limited to the shapes of regions shown herein, for example, to include a change in shape results in manufacturing. The following example embodiments may also be constituted by one or a combination thereof.

The contents described below may have a variety of configurations and propose only an example configuration herein, but are not limited thereto.

Figure 2:
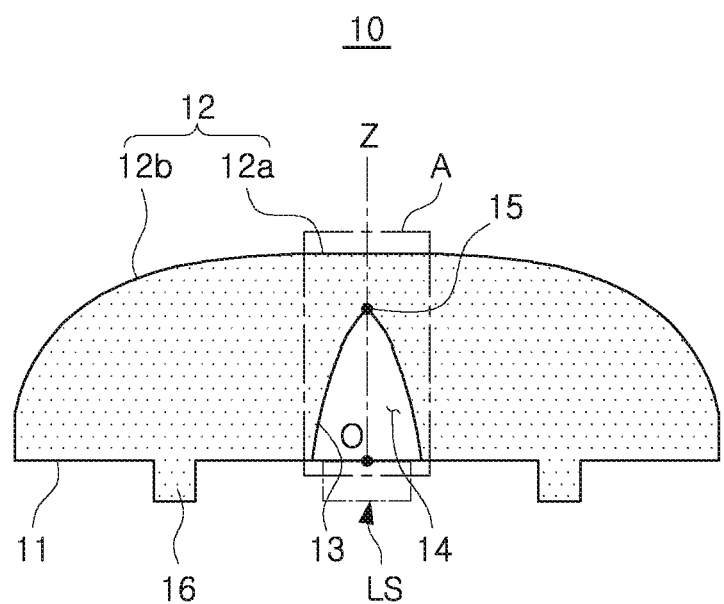
FIG. 2 is a cross-sectional view of the optical device of FIG. 1.

FIG. 1 is a schematic perspective view of an optical device 10 according to an example embodiment. FIG. 2 is a cross-sectional view of the optical device 10 of FIG. 1.

Referring to FIG. 1 and FIG. 2, the optical device according to an example embodiment is disposed above a light source LS and may adjust an angle of a beam of light emitted by the light source LS. Here, the light source LS may include, for example, a light emitting device package. In addition, the optical device 10 may include a wide beam angle lens for implementing a wide angle of beam spread by diffusing light of the light source LS.

As illustrated in FIG. 1 and FIG. 2, the optical device 10 according to an example embodiment includes a first surface 11 including an incident portion facing the light source LS, and a second surface 12 disposed opposite to the first surface 11.

The first surface 11 may be a bottom surface of the optical device 10. The first surface 11 may have a substantially flat circular shape in horizontal cross-section.

The first surface 11 includes an incident portion 13 disposed above the light source LS and facing the light source LS, light of the light source LS being incident through the incident portion 13.

The incident portion 13 is recessed toward the second surface 12 in a central portion thereof through which an optical axis Z passes to form a recess 14 of the first surface 11. The recess 14 may have a rotationally symmetrical structure with respect to the optical axis Z passing through a central portion of the optical device 10, and a surface of the recess 14 may define the incident portion 13 through which light from the light source LS is incident. Light generated by the light source LS may proceed to the interior of the optical device 10 through the recess 14.

The recess 14 may be exposed outwardly through the first surface 11 and may be disposed to face the light source LS.

The incident portion 13 corresponding to the surface of the recess 14 may include a free-form surface recessed toward the second surface 12, and may converge on a central portion thereof through which the optical axis Z passes from the first surface 11. The incident portion 13 includes a pointed vertex portion 15 in the central portion.

The incident portion 13 may have a rotationally symmetrical structure with respect to the optical axis Z. In addition, the incident portion 13 may have a structure in which variations in slopes of two curved surface portions (two portions of the curved surface) symmetrical to each other based on the optical axis Z are discontinuous in the vertex portion 15.

Figure 3:
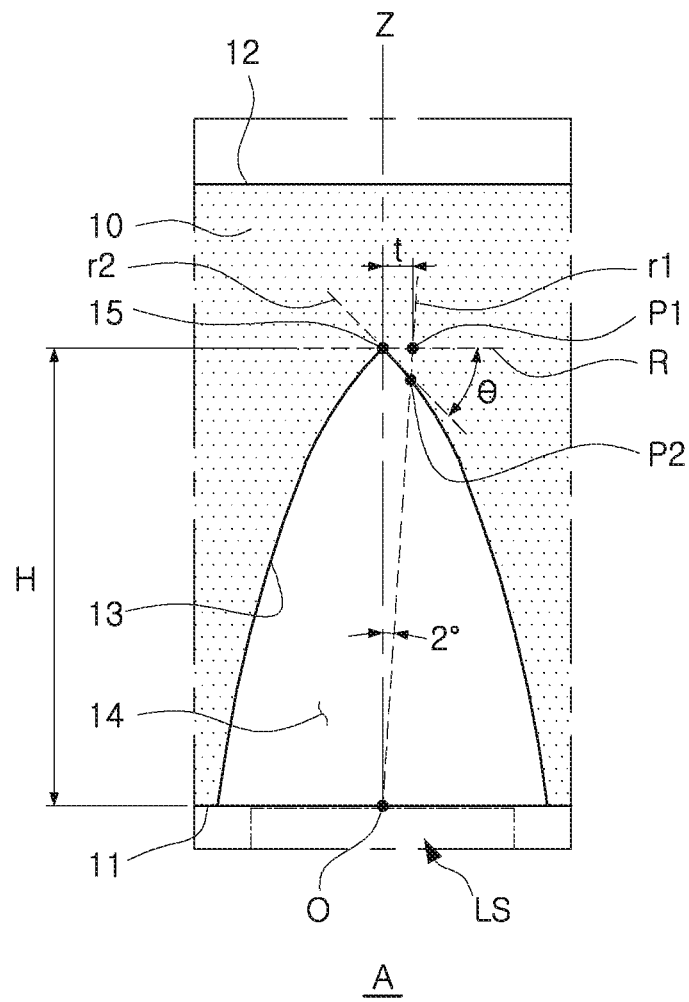
FIG. 3 is an enlarged cross-sectional view of an incident portion of FIG. 2.

FIG. 3 is an enlarged view A of the incident portion of FIG. 1. As illustrated in FIG. 3, a shape of the incident portion 13 may have a structure satisfying condition 1.

$$t = H \times \tan(2°), \text{ where } \theta > 10° \quad \text{Condition 1:}$$

Here, when an intersection point of the light source LS and the optical axis Z is a reference point 'O,' a straight line perpendicular to the optical axis Z from the vertex portion 15 is a reference line 'R,' and a straight line connecting an optional point P2 of the incident portion 13 and an optional point P1 of the reference line 'R' from the reference point 'O' is a straight line 'r1.'

'H' is a height to the vertex portion 15 from the reference point 'O,' '2°' is an angle formed by the straight line 'r1' and the optical axis Z, 't' is a distance from the vertex portion 15 to the optional point P1 of the reference line 'R,' and 'θ' is an angle formed by a straight line 'r2' connecting the vertex portion 15 and the optional point P2 of the incident portion 13, and the reference line 'R.'

Referring again to FIGS. 1 and 2, the first surface 11 includes a support portion 16 protruding toward the light source LS. The support portion 16 may be integrated with the optical device 10 or may be attached to the first surface 11 using an adhesive or the like. The support portion 16 may be provided as a plurality of support portions 16 disposed along a circumferential portion of the recess 14 to surround the recess 14.

When the optical device 10 is mounted on, for example, a substrate, the support portions 16 may fix and support the optical device 10. That is, the optical device 10 may be mounted on the substrate by the support portions 16.

The second surface 12 is disposed opposite to the first surface 11. The second surface 12, a light emitting surface from which the light incident through the incident portion 13 is emitted outwardly, may be a top surface of the optical device 10.

The second surface 12 may have a structure in which it protrudes convexly from an edge thereof connected to the first surface 11 in an upward direction in which light proceeds, and a central portion of the second surface 12 through which the optical axis Z passes may have a maximum height.

In FIG. 2, the second surface 12 includes a planar portion 12a in which the central portion through which the optical axis Z passes includes a substantially flat surface, and a convex portion 12b including a convex curve surface continuously extended to an edge of the first surface 11 from an edge of the planar portion 12a.

The optical device 10 may be formed of a resin material having light-transmissive properties, for example, polycarbonate (PC), polymethyl methacrylate (PMMA), an acrylic material, or the like. In addition, the optical device 10 may be formed of a glass material, but is not limited thereto.

The optical device 10 may contain a light dispersion material in a range of about 3% to 15%. The light dispersion material may include at least one selected from a group consisting of $SiO_2$, $TiO_2$ and $Al_2O_3$. In a case in which the light dispersion material is included in an amount of less than 3%, light may not be sufficiently dispersed, such that light dispersion effects may not be expected. In a case in which the light dispersion material is included in an amount greater than 15%, a quantity of light emitted outwardly through the optical device 10 may be reduced to thereby degrade light extraction efficiency.

The optical device 10 may be formed by schemes of injecting a liquid solvent into a mold to be solidified. For example, the schemes may include an injection molding method, a transfer molding method, a compression molding method, and the like.

Figure 4:
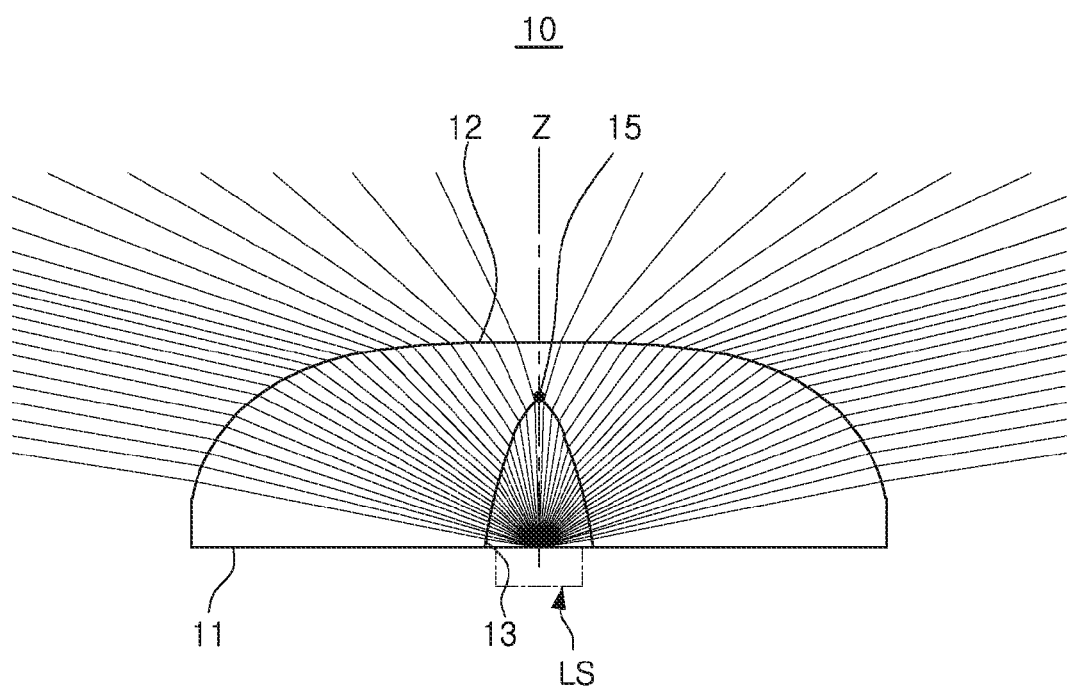
FIG. 4 is a cross-sectional view illustrating a path of light from a light source through the optical device of FIG. 2.

FIG. 4 is a cross-sectional view illustrating a path of light from the light source LS through the optical device 10 of FIG. 2.

As illustrated in FIG. 4, the incident portion 13 facing the light source LS of the optical device 10 according to an example embodiment may converge on the central portion of the second surface 12 through which the optical axis Z passes and thus, may include the pointed vertex portion 15 in the central portion. That is, the incident portion 13 may have a structure in which a slope variation is discontinuous in the vertex portion 15 of the central portion. Such an incident portion 13 may form a light path capable of significantly increasing the diffusion of light proceeding to the central portion of the optical device 10. Thus, maximization of luminance distribution in the central portion of the optical device 10 may be prevented.

In addition, the second surface 12 corresponding to a light emitting surface may have a substantially flat structure in the central portion of the second surface 12, and thus, the optical device 10 may be structured such that the central portion thereof through which the optical axis Z passes has a maximum height. That is, in the central portion, a slope variation may be gradual and continuous. Thus, soft, diffused light may be emitted from the optical device 10.

In this manner, the optical device 10 according to the example embodiments may emit soft, diffused light, while having a simplified structure as compared to lenses according to the related art. In addition, manufacturing capability may be improved through a simplified structure, thereby leading to improvements in productivity. In addition, because the optical device 10 has a structure facilitating a mass-production, manufacturing costs of the optical device 10 may be reduced.

Figure 5A:
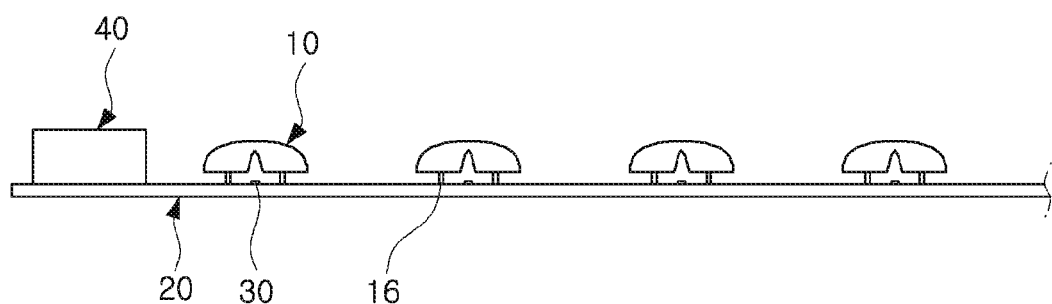
FIG. 5A and FIG. 5B are a cross-sectional view and a plan view of a light source module according to an example embodiment.
Figure 5B:
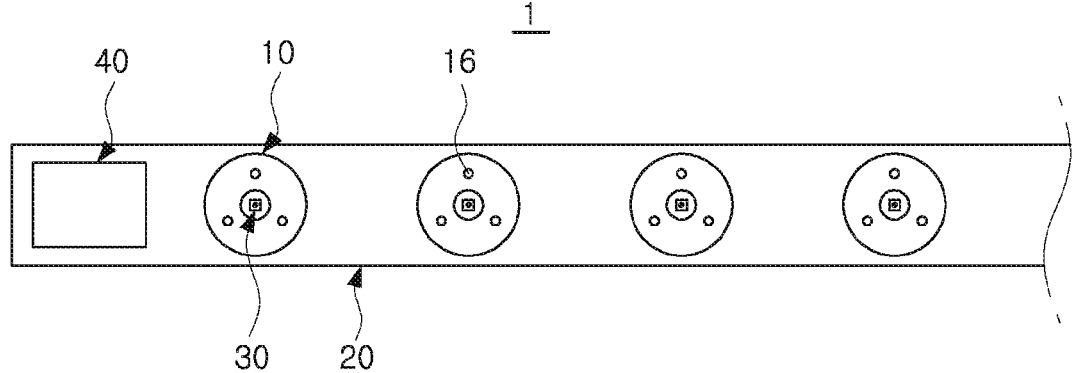
Figure 6:
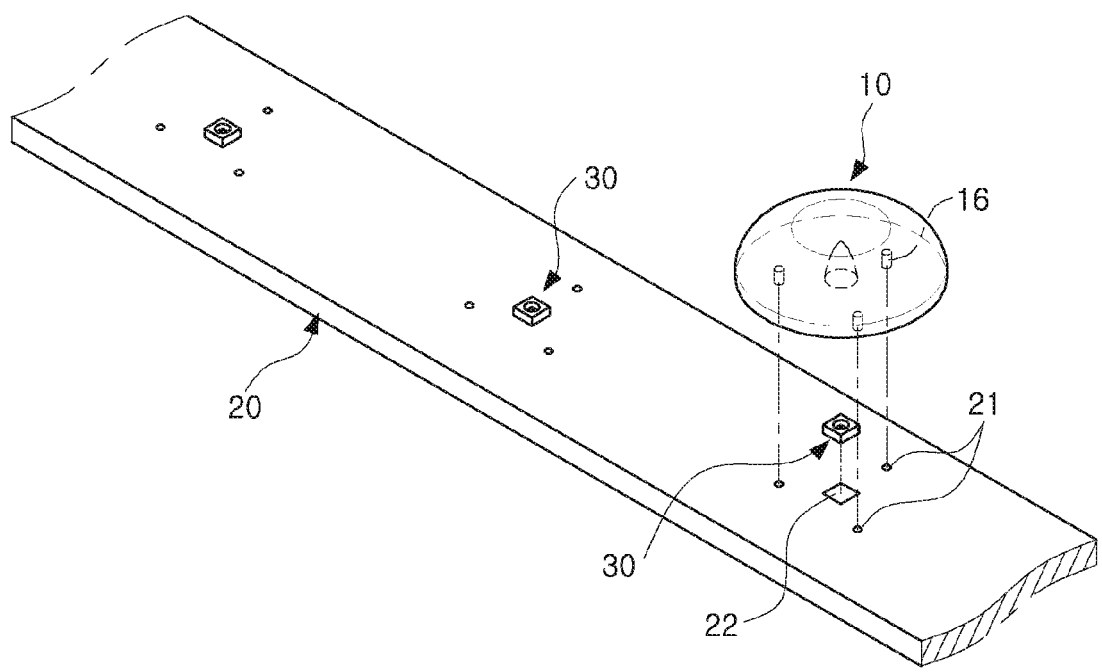
FIG. 6 is a perspective view illustrating a substrate on which a light source and an optical device are to be mounted, according to an example embodiment.

FIG. 5A and FIG. 5B are a cross-sectional view and a plan view of a light source module 1 according to an example embodiment. FIG. 6 is a perspective view illustrating a substrate 20 on which a light source 30 and the optical device 10 are to be mounted, according to an example embodiment.

Referring to FIG. 5 and FIG. 6, the light source module 1 according to an example embodiment includes the substrate 20, the light source 30 mounted or to be mounted on the substrate 20, and the optical device 10 disposed or to be disposed on the light source 30.

The substrate 20 may be a printed circuit board (PCB), for example, a FR4-type PCB or a flexible PCB able to be easily deformed. The PCB may be formed of an organic resin material containing epoxy, triazine, silicon, polyimide, and the like, or other organic resin materials. Alternatively, the PCB may be formed of a ceramic material such as silicon nitride, AlN, $Al_2O_3$, or the like, or may be formed of a metal and a metal compound such as a metal core printed circuit board (MCPCB), MCCL, and the like.

The substrate 20 may have a rectangular bar structure being elongated in a lengthwise direction. However, the structure of the substrate 20 according to an example embodiment is provided by way of example, but is not limited thereto. The substrate 20 may be variously structured to correspond to a structure of a product mounted thereon and for example, may have a circular structure.

Referring to FIG. 6, the substrate 20 includes fiducial marks 21 and light source mounting regions 22. The fiducial marks 21 and the light source mounting regions 22 may guide the optical device 10 and the light source 30 to positions for the mounting thereof. The fiducial marks 21 may be disposed along the circumferential portion of each of the light source mounting regions 22.

A plurality of light sources 30 may be respectively mounted in the light source mounting regions 22 provided on one surface of the substrate 20 and may be arranged in the lengthwise direction of the substrate 20. The number of optical devices 10 may correspond to the number of the light sources 30. In addition, the optical device 10 may be mounted on the substrate 20 to cover each of the light sources 30 using the fiducial marks 21 relative to each of the light source mounting regions 22.

The light source 30 may be an optoelectronic device generating light having a predetermined wavelength through externally applied driving power. For example, the light source 30 may include a semiconductor light emitting diode (LED) chip including an n-type semiconductor layer, a p-type semiconductor layer, and an active layer interposed therebetween, or the light source 30 may include an LED package including the LED chip.

The light source 30 may emit blue light, green light, or red light according to a material contained therein or a combination thereof with a phosphor and alternatively, may emit white light, ultraviolet light, or the like. The light sources 30 may be variously configured, such as to be the same type of light sources generating light having the same wavelength or different types of light sources generating light of different wavelengths. In addition, the light sources 30 may be variously configured depending on the use of a power level such as 0.5 W and 1 W.

The optical device 10 may be mounted on the substrate 20 to cover each of the plurality of light sources 30. The number of optical devices 10 may correspond to the number of the light sources 30. In addition, the optical device 10 may be mounted on the substrate 20 to cover each light source 30 using the fiducial marks 21 relative to each light source mounting region 22.

In addition to the plurality of light sources 30 and optical devices 10, a connector 40 is mounted on the substrate 20 to be connected to an external power source. The connector 40 may be disposed in one end portion of the substrate 20.

In the light source module 1 according to the example embodiments, the light sources 30 formed in various manners may be employed. The light sources 30 may be LED chips having various structures or an LED package on which the LED chips are mounted.

Figure 7A:
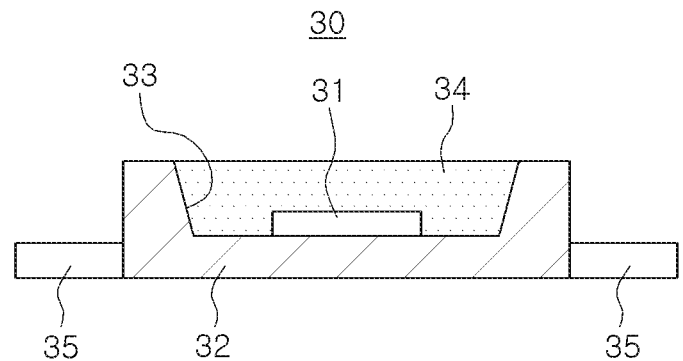
FIG. 7A and FIG. 7B are cross-sectional views of a light source employable in a light source module, according to example embodiments.
Figure 7B:
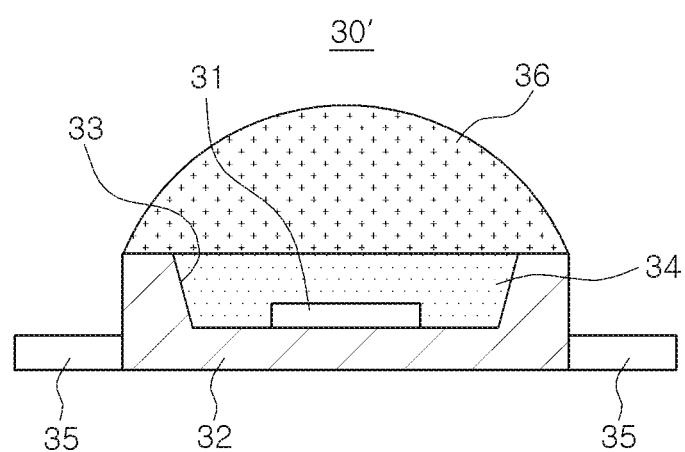

FIG. 7A and FIG. 7B are cross-sectional views of a light source employable in a light source module, according to example embodiments. FIG. 7A schematically illustrates the light source 30. As illustrated in FIG. 7A, the light source 30 may have a package structure in which an LED chip 31 is mounted in a package body 32 including a reflective cup 33. The LED chip 31 is covered by an encapsulating part 34 including phosphors. The example embodiments illustrate a case in which the light source 30 is an LED package, but is not limited thereto.

The package body 32 may correspond to a base member on which the LED chip 31 is mounted and is supported thereby, and may be formed of a white molding compound having a high degree of light reflectance, whereby effects of increasing the quantity of outwardly emitted light by reflecting light emitted by the LED chip 31 may be provided. Such a white molding compound may contain a thermosetting resin having high heat resistance or a silicon resin. Alternatively, a white pigment and filler, a curing agent, a release agent, an antioxidant, an adhesion improver, or the like may be added to a thermoplastic resin. In addition, the white molding compound may be formed of FR-4, CEM-3, an epoxy material, a ceramic material, or the like. Further, the white molding compound may be formed of a metal such as aluminum (Al).

The package body 32 is provided with lead frames 35 for forming an electrical connection with an external power source. The lead frames 35 may be formed of a material, for example, a metal such as aluminum, copper, or the like, having excellent electrical conductivity. In a case in which the package body 32 is formed of a metal, an insulating material may be interposed between the package body 32 and the lead frames 35.

The lead frames 35 may be exposed to the reflective cup 33 of the package body 32 through a bottom surface of the reflective cup 33 on which the LED chip 31 is mounted. The LED chip 31 may be electrically connected to the exposed lead frames 35.

A cross-section of the reflective cup 33 exposed at an upper surface of the package body 32 may be greater than that of the bottom surface of the reflective cup 33. Here, the cross-section of the reflective cup 33 exposed at the upper surface of the package body 32 may define a light emitting surface of the light source 30.

The LED chip 31 is enclosed by the encapsulating part 34 disposed within the reflective cup 33 of the package body 32. The encapsulating part 34 may contain a wavelength conversion material.

FIG. 7B schematically illustrates a light source 30' according to a modified example of the light source 30. As illustrated in FIG. 7B, a lens part 36 covering the encapsulating part 34 is further attached to the package body 32.

The lens part 36 may have a hemispherical structure and for example, may be a convex lens. The lens part 36 may refract light generated by the LED chip 31 and irradiate the light in a more extended range.

The wavelength conversion material contained in the encapsulating part 34 may contain at least one or more phosphors excited by light generated by the LED chip 31 and emitting light of different wavelengths. By doing so, a control may be made such that various colors of light as well as white light may be emitted.

For example, in a case in which the LED chip 31 emits blue light, white light may be emitted by combining yellow, green, red, and/or orange colored phosphors. In addition, the LED chip 31 may be configured to include at least one LED chip emitting violet, blue, green, red, or ultraviolet light. In this case, a color rendering index (CRI) of the LED chip 31 may be adjusted from about 40 to 100, and the LED chip 31 may generate various types of white light with color temperatures ranging from about 2000K to 20000K. Also, the LED chip 31 may generate visible violet, blue, green, red, or orange light or infrared light to adjust the color of light according to a surrounding atmosphere and a desired user mood. Also, the LED chip 31 may generate a wavelength of light for promoting growth of plants.

Figure 8:
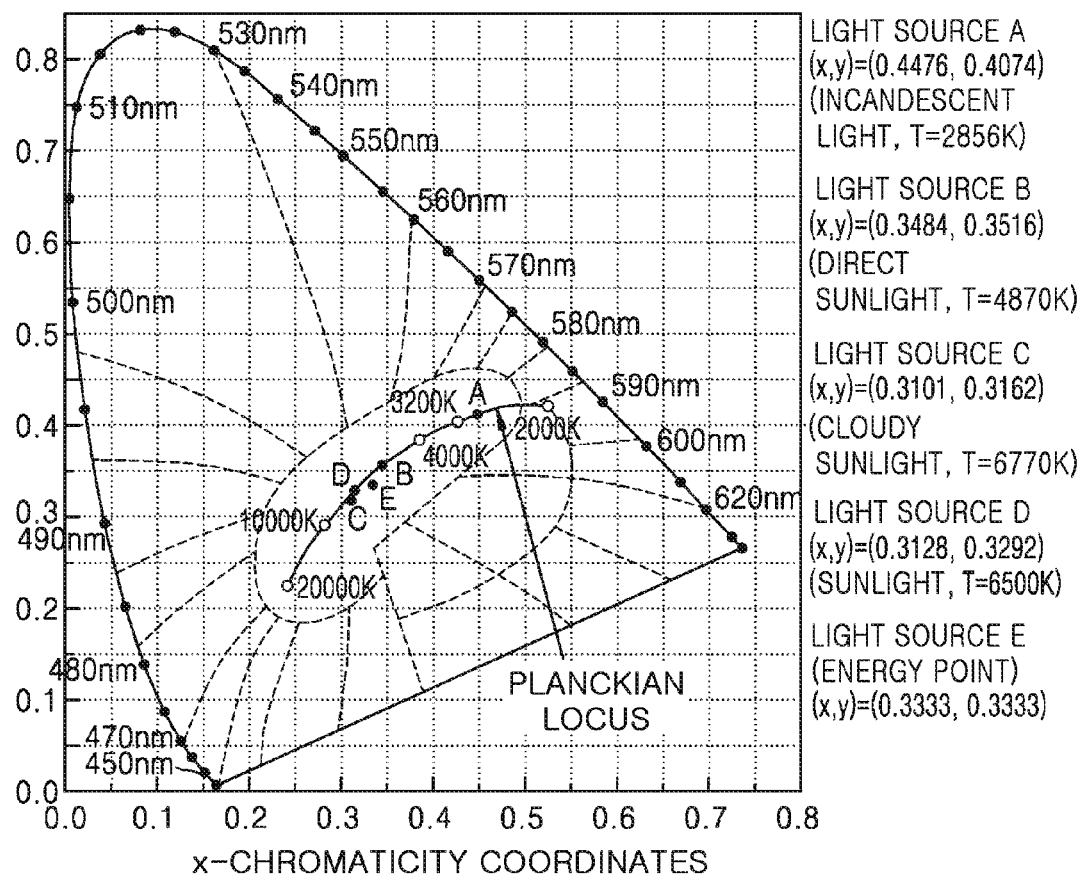
FIG. 8 is the CIE 1931 chromaticity coordinates system illustrating a wavelength conversion material employable in an example embodiment.

FIG. 8 is the CIE 1931 chromaticity coordinates system illustrating a wavelength conversion material employable in an example embodiment.

White light formed by combining yellow, green, red phosphors with a blue LED chip and/or combining green and red LED chips may have two or more peak wavelengths, and coordinates (x, y) thereof in the CIE 1931 chromaticity coordinates system of FIG. 8 may be positioned on a line segment connecting (0.4476, 0.4074), (0.3484, 0.3516), (0.3101, 0.3162), (0.3128, 0.3292), and (0.3333, 0.3333). Alternatively, coordinates (x, y) thereof in the CIE 1931 chromaticity coordinates system may be positioned in a region surrounded by the line segment and blackbody radiation spectrum. The color temperature of white light may range from about 2000K to 20000K.

In FIG. 8, white light in the vicinity of point E (0.3333, 0.3333), disposed below the blackbody radiation spectrum, may be in a state in which a level of yellow light is relatively low and may be used as a lighting light source in a region exhibiting a more bright or fresh feeling. Therefore, lighting products using white light in the vicinity of point E (0.3333, 0.3333), disposed below the blackbody radiation spectrum, may be highly effective as lighting devices for retail spaces offering groceries, clothes, and the like for sale.

The phosphors may have the following compositional formulas and colors.

Oxides: yellow and green $Y_3Al_5O_{12}$:Ce, $Tb_3Al_5O_{12}$:Ce, $Lu_3Al_5O_{12}$:Ce Silicates: yellow and green $(Ba,Sr)_2SiO_4$:Eu, yellow and orange $(Ba,Sr)_3SiO_5$:Ce Nitrides: green β-SiAlON:Eu, yellow $La_3Si_6N_{11}$:Ce, orange α-SiAlON:Eu, red $CaAlSiN_3$:Eu, $Sr_2Si_5N_8$:Eu, $SrSiAl_4N_7$:Eu, $SrLiAl_3N_4$:Eu, $Ln_{4-x}(Eu_zM_{1-z})_xSi_{12-y}Al_yO_{3+x+y}N_{18-x-y}$ (0.5≤x≤3, 0<z<0.3, 0<y≤4) (where, Ln is at least one element selected from a group consisting of group IIIa elements and rare-earth elements, and M is at least one element selected from a group consisting of Ca, Ba, Sr and Mg)

Fluorides: KSF-based red $K_2SiF_6$:$Mn^{4+}$, $K_2TiF_6$:$Mn^{4+}$, $NaYF_4$:$Mn^{4+}$, $NaGdF_4$:$Mn^{4+}$ and $K_3SiF_7$:$Mn^{4+}$ Phosphor compositions may basically conform to stoichiometry, and respective elements may be substituted with other elements of respective groups of the periodic table. For example, strontium (Sr) may be substituted with barium (Ba), calcium (Ca), magnesium (Mg), and the like within the alkaline earth group (II), and yttrium (Y) may be substituted with lanthanum (La)-based elements such as terbium (Tb), lutetium (Lu), scandium (Sc), gadolinium (Gd), and the like. Also, europium (Eu), an activator, may be substituted with cerium (Ce), terbium (Tb), praseodymium (Pr), erbium (Er), ytterbium (Yb), and the like, according to a desired energy level, and an activator may be applied alone or with a co-activator for modifying characteristics of phosphors. To enhance reliability at high temperatures and high humidity, a fluoride-based red phosphor may be coated with a fluoride not containing manganese (Mn) or with organic materials thereon. The organic materials may be coated on the fluoride-based red phosphor coated with a fluoride not containing manganese (Mn). Unlike other phosphors, the fluoride-based red phosphor may realize a narrow full width at half maximum (FWHM) less than or equal to 40 nm, and thus, it may be utilized in high resolution TVs such as UHD TVs.

Further, as a material to be substituted for the phosphor, a quantum dot (QD) or the like may be used in the wavelength conversion material, and the QD may be used alone or in combination with the phosphor.

The quantum dot may have a core-shell structure using group III-VI or group II-V compound semiconductors. For example, the quantum dot may have a core such as CdSe or InP or a shell such as ZnS or ZnSe. Also, the quantum dot may include a ligand to stabilize the core and shell. For example, the core may have a diameter ranging from about 1 nm to 30 nm, particularly, about 3 nm to 10 nm. The shell may have a thickness ranging from about 0.1 nm to 20 nm, particularly, 0.5 nm to 2 nm.

The quantum dot may realize various colors of light according to a size thereof and when the quantum dot is used as a phosphor substitute, it may be substituted for a red or green phosphor. The use of the quantum dot may allow a narrow FWHM (e.g., about 35 nm) to be realized.

Hereinafter, example embodiments of an LED chip will be described.

Figure 9A:
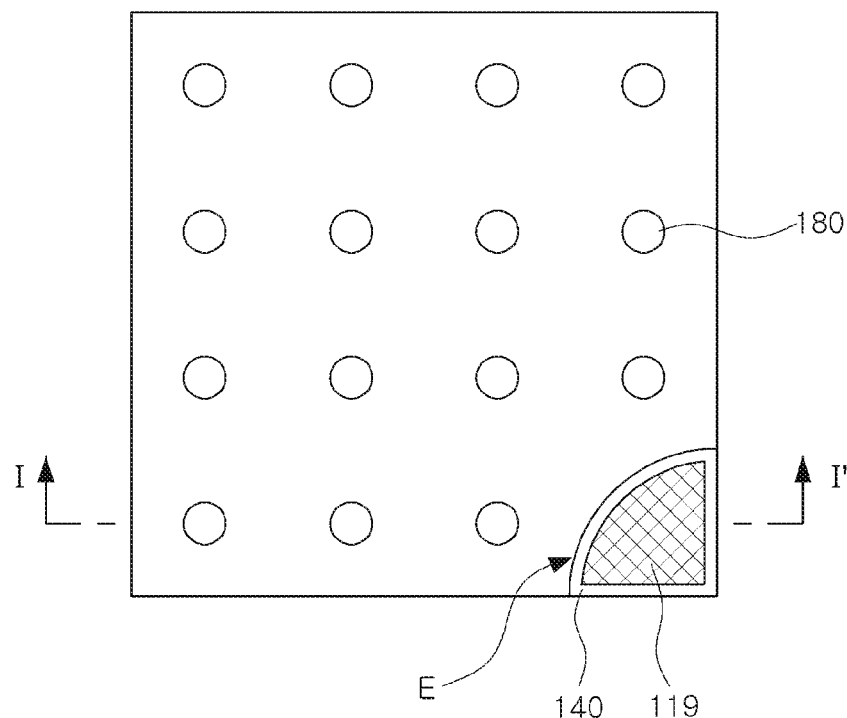
FIG. 9A is a plan view of an LED chip according to an example embodiment.
Figure 9B:
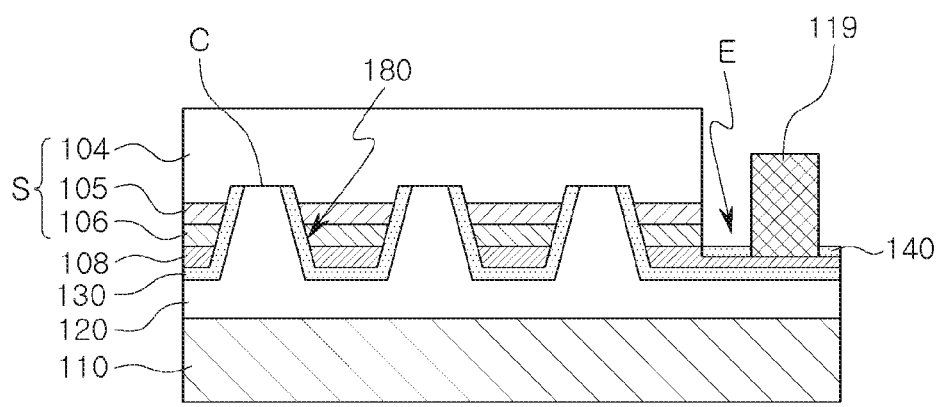
FIG. 9B is a cross-sectional view of the LED chip of FIG. 9A, taken along line I-I'.

FIG. 9A is a plan view of an LED chip 100 according to an example embodiment. FIG. 9B is a cross-sectional view of the LED chip 100 of FIG. 9A, taken along line I-I.'

The LED chip 100 illustrated in FIG. 9A and FIG. 9B may have a large area structure for a high lighting output. The LED chip 100 may be structured to increase current dispersion efficiency and heat radiation efficiency.

The LED chip 100 includes a light emitting laminate S, a first electrode 120, an insulating layer 130, a second electrode 108, and a conductive substrate 110. The light emitting laminate S includes a first conductivity-type semiconductor layer 104, an active layer 105, and a second conductivity-type semiconductor layer 106 sequentially stacked on one another.

The first conductivity-type semiconductor layer 104 may be a nitride semiconductor satisfying n-type $In_xAl_yGa_{1-x-y}N$ (0≤x<1, 0≤y<1, 0≤x+y<1), and an n-type dopant may be silicon (Si). For example, the first conductivity-type semiconductor layer 104 may contain n-type GaN.

The second conductivity-type semiconductor layer 106 may be a nitride semiconductor layer satisfying p-type $In_xAl_yGa_{1-x-y}N$ (0≤x<1, 0≤y<1, 0≤x+y<1), and a p-type dopant may be magnesium (Mg). For example, the second conductivity-type semiconductor layer 106 may contain p-type GaN.

The active layer 105 may have a multiple quantum well (MQW) structure in which quantum well layers and quantum barrier layers are alternately stacked. For example, the quantum well and quantum barrier layers may be formed of different compositions of $In_xAl_yGa_{1-x-y}N$ ($0 \leq x \leq 1$, $0 \leq y \leq 1$, $0 \leq x+y \leq 1$). In an example embodiment, the quantum well layer may be $In_xGa_{1-x}N$ ($0 < x \leq 1$) and the quantum barrier layer may be GaN or AlGaN. A thickness of each of the quantum well and quantum barrier layers may range from about 1 nm to 50 nm. The structure of the active layer 105 is not limited to the multiple quantum well (MQW) structure and may also be a single quantum well (SQW) structure.

The first electrode 120 may include one or more conductive vias 180 electrically insulated from the second conductivity-type semiconductor layer 106 and the active layer 105, and are extended to at least a portion of the first conductivity-type semiconductor layer 104 to be electrically connected to the first conductivity-type semiconductor layer 104. The conductive vias 180 pass through the second electrode 108, the second conductivity-type semiconductor layer 106, and the active layer 105 from an interface of the first electrode 120, and are extended to the interior of the first conductivity-type semiconductor layer 104. The conductive vias 180 may be formed using an etching process, for example, an inductively coupled plasma-reactive ion etching (ICP-RIE) process or the like.

An insulating layer 130 is disposed on the first electrode 120 to electrically insulate the first electrode 120 from other regions except for the first conductivity-type semiconductor layer 104. As illustrated in FIG. 9B, the insulating layer 130 is also disposed on a side surface of the conductive via 180, as well as between the second electrode 108 and the first electrode 120. By doing so, the second electrode 108, the second conductivity-type semiconductor layer 106, and the active layer 105 exposed to the side surface of the conductive via 180 are insulated from the first electrode 120. The insulating layer 130 may be formed by the deposition of an insulating material such as $SiO_2$, $SiO_xN_y$, or $Si_xN_y$.

A contact region C of the first conductivity-type semiconductor layer 104 is exposed by the conductive via 180, and a portion of the first electrode 120 is disposed to contact the contact region C through the conductive via 180. By doing so, the first electrode 120 is connected to the first conductivity-type semiconductor layer 104.

The number, shape, or pitch of the conductive vias 180 or a contact diameter (or a contact area) thereof with respect to the first and second conductivity-type semiconductor layers 104 and 106 may be appropriately adjusted to reduce contact resistance (as shown in FIG. 9A). Further, the conductive vias 180 may be variously arranged in rows and columns, whereby a current flow may be improved. The number of the conductive vias 180 or the contact area thereof may be adjusted such that an area of a contact region C may range from about 0.1% to 20%, for example, 0.5% to 15%, further, 1% to 10%, of a planar area of the light emitting laminate S. In the case that the electrode area is less than 0.1%, current dispersion may not be uniform to deteriorate light emission efficiency. On the other hand, in the case that the electrode area is greater than or equal to 20%, a light emitting area may be relatively reduced, thereby leading to decreases in light emission properties and luminance properties.

A radius of each conductive via 180 in the contact area coming into contact with the first conductivity-type semiconductor layer 104 may be, for example, approximately 1 µm to 50 µm. The number of the conductive vias 180 may be 1 to 48000 per region of the light emitting laminate S, depending on an area of the region of the light emitting laminate S. The number of the conductive vias 180 may be 2 to 45000, particularly, 5 to 40000, more particularly, 10 to 35000, per region of the light emitting laminate S, but may be varied depending on an area of the region of the light emitting laminate S. Distances between the respective conductive vias 180 may have a matrix structure having rows and columns of 10 µm to 1000 µm, for example, rows and columns of 50 µm to 700 µm, particularly, rows and columns of 100 µm to 500 µm, more particularly, rows and columns of 150 µm to 400 µm.

In the case that the distances between the respective conductive vias 180 are less than 10 µm, the number of the conductive vias 180 may be increased while a light emitting area may be relatively reduced, thereby leading to a decrease in light emission efficiency. In the case that the distances between the respective conductive vias 180 are greater than 1000 µm, current dispersion may not be facilitated to deteriorate light emission efficiency. Depths of the conductive vias 180 may be differently formed, depending on thicknesses of the second conductivity-type semiconductor layer 106 and the active layer 105 and for example, may be range from 0.1 µm to 5.0 µm.

As illustrated in FIG. 9B, the second electrode 108 provides an electrode forming region E extended and exposed outwardly from the light emitting laminate S. The electrode forming region E includes an electrode pad portion 119 for connecting an external power source to the second electrode 108. Although an example embodiment illustrates a case in which a single electrode forming region E is provided, the electrode forming region E may be provided in plural. As illustrated in FIG. 9A, the electrode forming region E may be formed on one edge of the LED chip 100.

As in the example embodiments, an insulating layer 140 for stopping etching is disposed in the perimeter of the electrode pad portion 119. The insulating layer 140 for stopping etching may be formed in the electrode forming region E prior to the forming of the second electrode 108 after the light emitting laminate S has been formed, and may serve as an etching stopping layer during an etching process for the electrode forming region E.

The second electrode 108 may be formed of a material having a high degree of reflectivity while forming an ohmic-contact with the second conductivity-type semiconductor layer 106. The material of the second electrode 108 may be a reflective electrode material.

Figure 10:
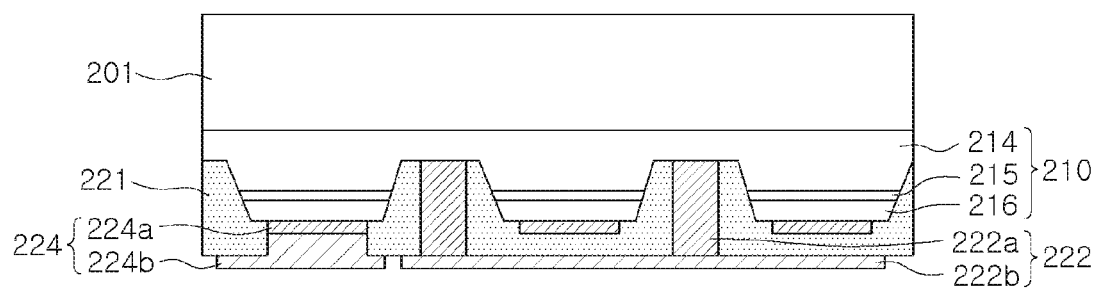
FIG. 10 is a side cross-sectional view of an LED chip according to an example embodiment.

FIG. 10 is a side cross-sectional view of an LED chip 200 according to an example embodiment.

Referring to FIG. 10, the LED chip 200 includes a semiconductor laminate 210 disposed on a substrate 201. The semiconductor laminate 210 includes a first conductivity-type semiconductor layer 214, an active layer 215, and a second conductivity-type semiconductor layer 216.

The LED chip 200 includes first and second electrodes 222 and 224 connected to the first and second conductivity-type semiconductor layers 214 and 216, respectively. The first electrode 222 includes a connection electrode portion 222a such as a conductive via penetrating through the second conductivity-type semiconductor layer 216 and the active layer 215 to be connected to the first conductivity-type semiconductor layer 214, and a first electrode pad 222b connected to the connection electrode portion 222a. The connection electrode portion 222a is surrounded by an insulating portion 221 and is electrically separated from the active layer 215 and the second conductivity-type semiconductor layer 216. The connection electrode portion 222*a* may be disposed in an etched region of the semiconductor laminate 210. The number, shape, or pitch of the connection electrode portion 222*a* or a contact area thereof with respect to the first conductivity-type semiconductor layer 214 may be appropriately designed to reduce contact resistance. Further, the connection electrode portion 222*a* may be arranged in rows and columns on the semiconductor laminate 210, whereby a current flow may be improved. The second electrode 224 includes an ohmic-contact layer 224*a* and a second electrode pad 224*b* on the second conductivity-type semiconductor layer 216.

Each of the connection electrode portion 222*a* and the ohmic-contact layer 224*a* may include a single layer or multilayer structure of a conductive material having ohmic-characteristics with the first and second conductivity-type semiconductor layers 214 and 216. For example, the connection electrode portion 222*a* and the ohmic-contact layer 224*a* may be formed by a process such as depositing or sputtering one or more among Ag, Al, Ni, Cr, a transparent conductive oxide (TCO) and the like.

The first and second electrode pads 222*b* and 224*b* are connected to the connection electrode portion 222*a* and the ohmic-contact layer 224*a* to serve as external terminals of the LED chip 200. For example, the first and second electrode pads 222*b* and 224*b* may be formed of Au, Ag, Al, Ti, W, Cu, Sn, Ni, Pt, Cr, NiSn, TiW, AuSn or eutectic metals thereof.

The first and second electrodes 222 and 224 may be disposed in the same direction and may be mounted on the lead frame or the like, in a flip-chip scheme.

The two electrodes 222 and 224 are electrically separated from each other by the insulating portion 221. The insulating portion 221 may be formed of any material, as long as the material has electrical insulating properties. Any material having electrical insulating properties while having a low degree of light absorptivity may be employed. For example, the insulating portion 221 may be formed of a silicon oxide or a silicon nitride such as $SiO_2$, $SiO_xN_y$, $Si_xN_y$, or the like. A light reflecting structure may be formed by dispersing light reflective fillers in a light transmissive material. Unlike this, the insulating portion 221 may have a multilayer reflection structure in which a plurality of insulating layers having different refractive indices may be alternately stacked. For example, such a multilayer reflection structure may be a distributed Bragg reflector (DBR) in which a first insulating layer having a first refractive index and a second insulating layer having a second refractive index are alternately stacked.

The multilayer reflection structure may be formed by repeatedly stacking a plurality of insulating layers having different reflective indices 2 times to 100 times, for example, 3 times to 70 times, further, 4 times to 50 times. The plurality of insulating layers of the multilayer reflection structure may be formed of an oxide or nitride and combinations thereof, such as $SiO_2$, SiN, $SiO_xN_y$, $TiO_2$, $Si_3N_4$, $Al_2O_3$, TiN, AlN, $ZrO_2$, TiAlN, TiSiN, or the like. For example, when a wavelength of light generated in the active layer is λ, and a refractive index of the corresponding layer is n, the first insulating layer and the second insulating layer may be formed to have a thickness of λ/4n, approximately 300 Å to 900 Å. In this case, the refractive indices and thickness of the first insulating layer and the second insulating layer may be selectively designed such that the insulating layers have a high degree of reflectance (95% or more) with respect to the wavelength of light generated in the active layer 215.

The refractive indices of the first insulating layer and the second insulating layer may be determined within a range of about 1.4 to about 2.5 and may be lower than refractive indices of the first conductivity-type semiconductor layer 214 and the substrate. However, the refractive indices of the first insulating layer and the second insulating layer may also be higher than the refractive index of the substrate while being lower than the refractive index of the first conductivity-type semiconductor layer 214.

Figure 11:
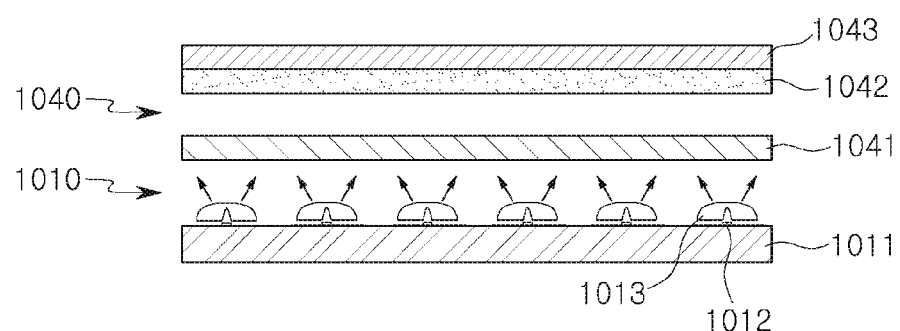
FIG. 11 is a cross-sectional view illustrating a lighting device according to an example embodiment.
Figure 12:
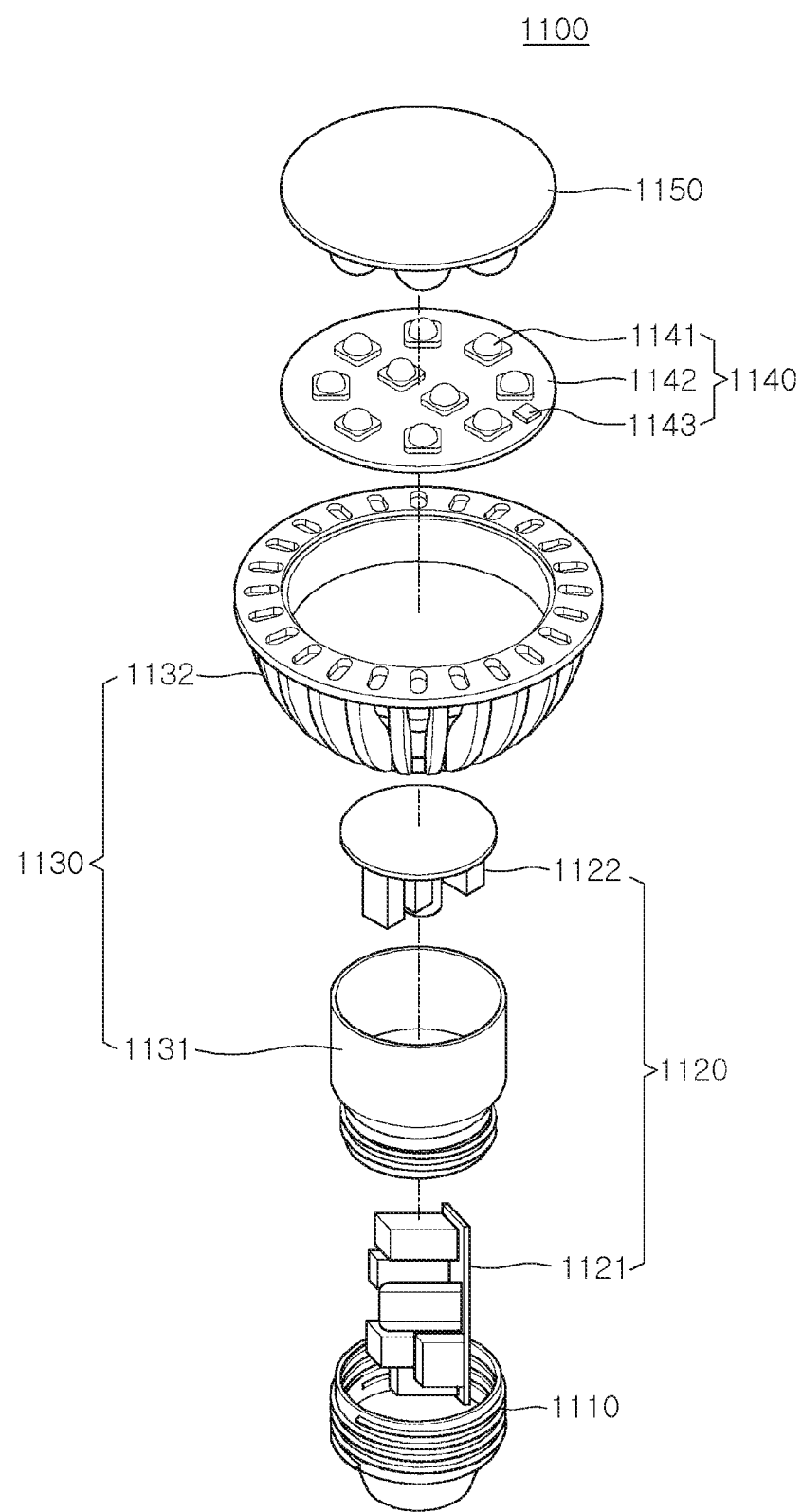
FIG. 12 is an exploded perspective view illustrating a lighting device (bulb type) according to an example embodiment.
Figure 13:
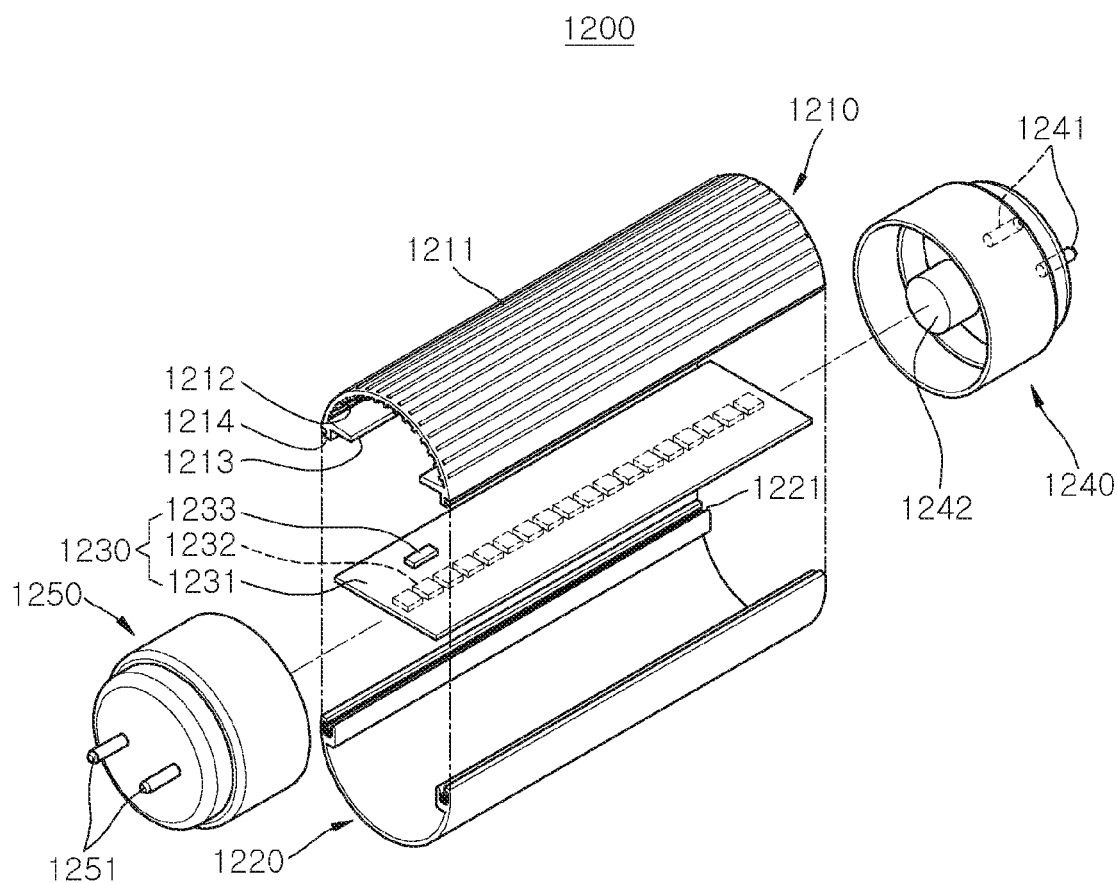
FIG. 13 is an exploded perspective view illustrating a lighting device (bar or L lamp type) according to an example embodiment.

With reference to FIG. 11 through FIG. 13, example embodiments of a lighting device employing a light source module according to an example embodiment will be described.

FIG. 11 is a cross-sectional view illustrating a lighting device 1000 according to an example embodiment. Referring to FIG. 11, the lighting device 1000 may have, by way of example, a surface light source type structure, and may be a direct type backlight.

The lighting device 1000 according to the example embodiments includes an optical sheet 1040 and a light source module 1010 arranged below the optical sheet 1040.

The optical sheet 1040 includes a diffusion sheet 1041, a light collecting sheet 1042, a protective sheet 1043, and the like.

The light source module 1010 includes a printed circuit board 1011, a plurality of light sources 1012 mounted on an upper surface of the printed circuit board 1011, and a plurality of optical devices 1013 disposed above the plurality of respective light sources 1012. In an example embodiment, the light source module 1010 may have a structure similar to the light source module 1 of FIG. 5 and FIG. 6. Soft, diffused light may be emitted because each of the plurality of optical devices 1013 has a pointed vertex portion in a central portion of an incident portion, and a central portion of a light emitting surface is substantially flat. A description regarding respective components of the light source module 1010 may be understood with reference to a foregoing example embodiment.

FIG. 12 is an exploded perspective view illustrating a lighting device 1100 (bulb type) according to an example embodiment.

In detail, the lighting device 1100 includes a socket 1110, a power source 1120, a heat dissipater 1130, a light source module 1140, and an optical portion 1150. According to an example embodiment, the light source module 1140 may include a light emitting device array, and the power source 1120 may include a light emitting device driver.

The socket 1110 may be configured to be replaced with an existing lighting device. Power supplied to the lighting device 1100 may be applied through the socket 1110. As illustrated, the power source 1120 includes a first power source 1121 and a second power source 1122. The first power source 1121 and the second power source 1122 may be separately provided and assembled to form the power source 1120.

The heat dissipater 1130 includes an internal heat dissipater 1131 and an external heat dissipater 1132. The internal heat dissipater 1131 may be directly connected to the light source module 1140 and/or the power source 1120 to thereby transmit heat to the external heat dissipater 1132.

The optical portion 1150 may include an internal optical portion and an external optical portion, and may be configured to evenly distribute light emitted by the light source module 1140.

The light source module 1140 may emit light to the optical portion 1150 upon receiving power from the power source 1120. The light source module 1140 may include one or more light emitting devices 1141, a circuit board 1142, and a controller 1143. The controller 1143 may store driving information of the light emitting devices 1141.

In an example embodiment, the light source module 1140 may have a structure similar to the light source module 1 of FIG. 5 and FIG. 6. A description regarding respective components of the light source module 1140 may be understood with reference to the foregoing example embodiments.

FIG. 13 is an exploded perspective view illustrating a lighting device 1200 (bar or L lamp type) according to an example embodiment.

In detail, the lighting device 1200 includes a heat dissipation member 1210, a cover 1220, a light source module 1230, a first socket 1240, and a second socket 1250. A plurality of heat dissipation fins 1211 and 1212 may be disposed in a concavo-convex pattern on an internal and/or external surface of the heat dissipation member 1210, and the heat dissipation fins 1211 and 1212 may be designed to have various shapes and intervals (spaces) therebetween. A support portion 1213 having a protruded shape is disposed on an inner side of the heat dissipation member 1210. The light source module 1230 may be fixed to the support portion 1213. Stoppage protrusions 1214 are disposed on both ends of the heat dissipation member 1210.

The stoppage recesses 1221 are disposed in the cover 1220, and the stoppage protrusions 1214 of the heat dissipation member 1210 may be coupled to the stoppage recesses 1221. The positions of the stoppage recesses 1221 and the stoppage protrusions 1214 may be interchanged.

The light source module 1230 may include a light emitting device array. The light source module 1230 includes a PCB 1231, a light source 1232 having an optical device, and a controller 1233. As described above, the controller 1233 may store driving information of the light source 1232. Circuit wirings are formed on the PCB 1231 to operate the light source 1232. Also, components for operating the light source 1232 may be provided. In an example embodiment, the light source module 1230 is substantially identical to the light source module 1 of FIG. 5 and FIG. 6, and a detailed description thereof will be omitted.

The first and second sockets 1240 and 1250, a pair of sockets, are respectively coupled to opposing ends of the cylindrical cover including the heat dissipation member 1210 and the cover 1220. For example, the first socket 1240 includes electrode terminals 1241 and a power source 1242, and dummy terminals 1251 are disposed on the second socket 1250. Also, an optical sensor and/or a communications interface may be installed in either the first socket 1240 or the second socket 1250. For example, the optical sensor and/or the communications interface may be installed in the second socket 1250 on which the dummy terminals 1251 are disposed. In another example, the optical sensor and/or the communications interface may be installed in the first socket 1240 on which the electrode terminals 1241 are disposed.

The lighting device using the light emitting device may be classified as an indoor lighting device and an outdoor lighting device. Indoor LED lighting devices may be provided to replace or retrofit existing lighting devices, and may include bulb type lamps, fluorescent lamps (LED-tubes), and flat type illumination devices. Outdoor LED lighting devices may include street lamps, security lamps, floodlighting lamps, scenery lamps, traffic lights, and the like.

The lighting device using LEDs may be employed as internal or external light sources of vehicles. Internal light sources of vehicles may include interior lights, reading lights, dashboard light sources, and the like. External light sources of vehicles may include various light sources such as headlights, brake lights, turn indicators, fog lights, running lights, and the like.

In addition, as light sources used for robots or various mechanical devices, LED lighting devices may be used. LED lighting devices using waveform bands may promote the growth of plants and may stabilize human emotions or treat illnesses in humans.

As set forth above, according to the example embodiments, an optical device capable of increasing uniformity in luminance distribution to emit soft diffused light, and a light source module including the same, are provided.

Although a few example embodiments have been shown and described, it would be appreciated by those skilled in the art that changes may be made in the example embodiments without departing from the principles and spirit of the disclosure, the scope of which is defined in the claims and their equivalents.

What is claimed is:

1. An optical device comprising:
 a first surface comprising an incident portion through which light that is emitted from a light source is incident; and
 a second surface through which the light incident through the incident portion is emitted,
 wherein the incident portion comprises:
 a curved surface that is recessed toward the second surface; and
 a pointed vertex to which the curved surface is recessed, the pointed vertex being in a central portion of the optical device, and the central portion being through which an optical axis of the optical device passes.

2. The optical device of claim 1, wherein the curved surface comprises portions symmetrical based on the optical axis, the portions having variations in slopes that are discontinuous in the vertex.

3. The optical device of claim 1, wherein a shape of the incident portion satisfies a condition, $$t = H \times \tan(2°), \text{ where } \theta > 10°,$$

an intersection point of the light source and the optical axis is a reference point 'O,'
 a straight line perpendicular to the optical axis from the vertex is a reference line 'R,'
 a straight line connecting a point of the incident portion and a point of the reference line 'R' from the reference point 'O' is a straight line 'r1,'
 'H' is a height from the reference point 'O' to the vertex,
 '2°' is an angle between the straight line 'r1' and the optical axis,
 't' is a distance from the vertex to the point of the reference line 'R,' and
 'θ' is an angle between a straight line 'r2' connecting the vertex and the point of the incident portion, and the reference line 'R.'

4. The optical device of claim 1, wherein the incident portion further comprises a free-form surface and is rotationally symmetric with respect to the optical axis.

5. The optical device of claim 1, wherein the second surface is convex in a direction in which the light proceeds through the second surface, and
 a central portion of the second surface has a maximum height, the central portion of the second surface being through which the optical axis passes.

6. The optical device of claim 1, wherein the second surface comprises:

a planar portion comprising a substantially flat surface in a central portion of the second surface, the central portion of the second surface being through which the optical axis passes; and a convex portion comprising a convex curve surface extending from an edge of the planar portion to an edge of the first surface.

7. The optical device of claim 1, wherein the first surface further comprises a recess toward the second surface, in a central portion of the second surface, the central portion of the second surface being through which the optical axis passes.

8. The optical device of claim 7, wherein the incident portion is a surface of the recess.

9. The optical device of claim 1, wherein the first surface further comprises a support portion protruding from the first surface.

10. The optical device of claim 9, wherein the support portion comprises support portions disposed along a circumferential portion of the optical axis.

11. The optical device of claim 1, wherein the optical device comprises glass or a resin that is light-transmissive.

12. A light source module comprising:
a light source emitting light; and
an optical device disposed on the light source, the optical device comprising:
 a first surface comprising an incident portion through which the light is incident; and
 a second surface disposed opposite to the first surface, the second surface being through which the light incident through the incident portion is emitted,
 wherein the incident portion comprises a curved surface that is recessed toward the second surface, and a pointed vertex to which the curved surface is recessed, the pointed vertex being in a central portion of the optical device, and the central portion being through which an optical axis of the optical device passes.

13. The light source module of claim 12, wherein the light source further comprises an encapsulating part covering a light-emitting diode chip.

14. The light source module of claim 13, wherein the encapsulating part comprises one or more phosphors.

15. The light source module of claim 12, further comprising a substrate,
wherein the light source comprises light sources disposed on the substrate, and
the optical device comprises optical devices disposed on the substrate.

16. The light source module of claim 15, wherein the substrate comprises a mark for guiding the optical device and the light source to a position on the substrate, the position being on which the optical device and the light source are disposed.

17. An optical device comprising:
a first surface through which light that is emitted from a light source passes; and
a second surface through which the passed light is emitted,
wherein the first surface comprises a recess toward the second surface to a vertex, the recess comprising a curved surface, and the recess being through which an optical axis of the optical device passes.

18. The optical device of claim 17, wherein the curved surface comprises portions symmetrical about the optical axis,
the portions are recessed to the vertex, and
the optical axis passes through the vertex.

19. The optical device of claim 17, wherein the second surface is substantially flat in a central portion.

20. The optical device of claim 17, wherein the second surface is convex.

* * * * *